March 20, 1945.   P. PRITCHARD   2,371,980
MOLDING MACHINE
Filed May 8, 1942   2 Sheets-Sheet 1

Inventor:
Percy Pritchard
By Williams, Bradbury & Hinkle
Att'ys

March 20, 1945.    P. PRITCHARD    2,371,980
MOLDING MACHINE
Filed May 8, 1942    2 Sheets-Sheet 2
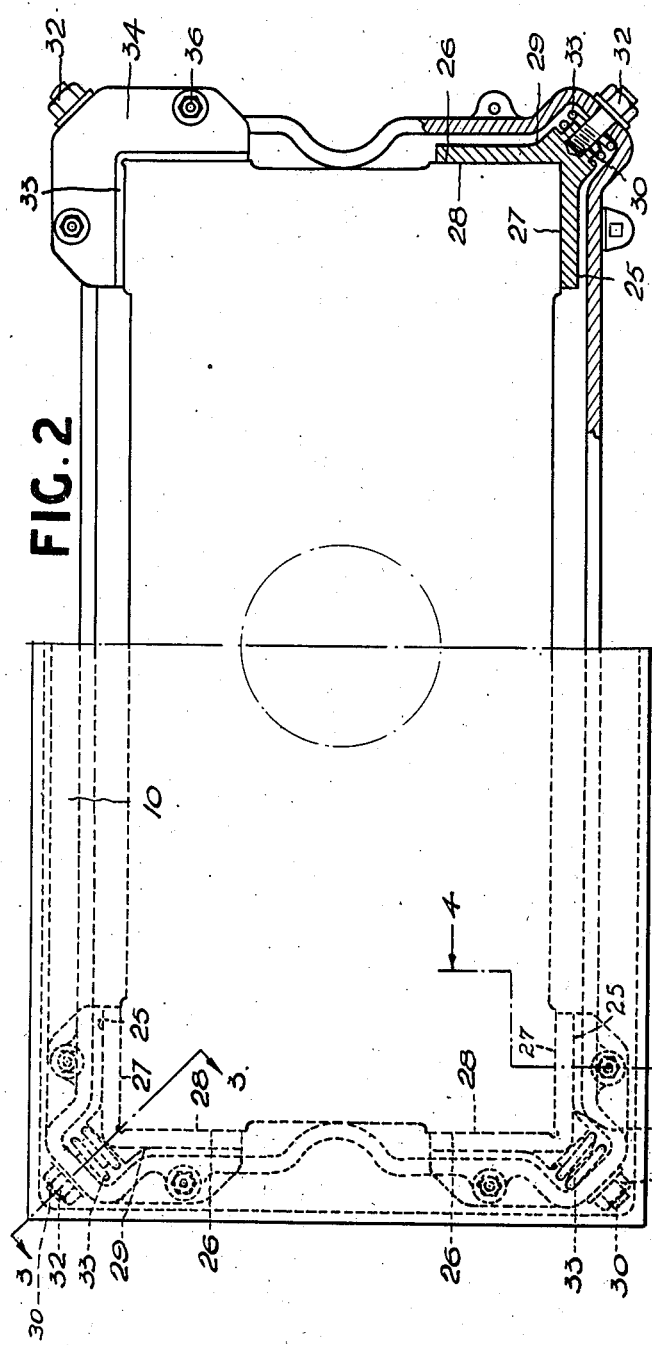
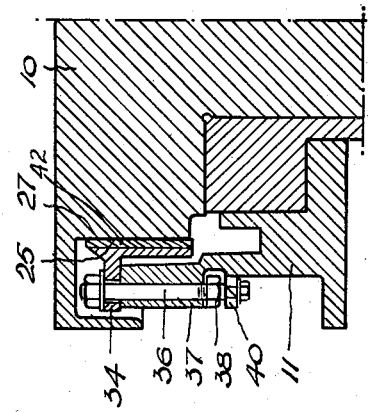
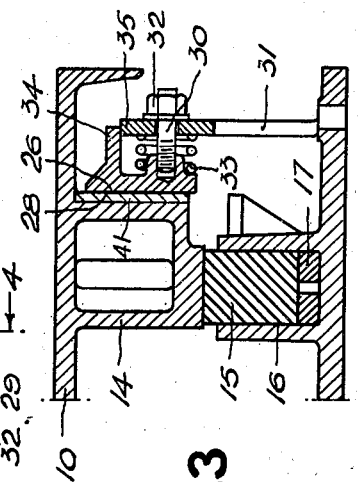
Inventor
Percy Pritchard Patented Mar. 20, 1945

2,371,980

UNITED STATES PATENT OFFICE 2,371,980

MOLDING MACHINE

Percy Pritchard, Wootton Wawen, England

Application May 8, 1942, Serial No. 442,187
In Great Britain June 4, 1941

3 Claims. (Cl. 22—45)

This invention relates to improvements in molding machines of the type in which a mold to be rammed is placed on a vertically movable table which is jarred by a pneumatic cylinder or ram.

In such machines it is desirable that the table should be effectively guided in its vertical reciprocating movement as uniformity in the ramming of the mold is affected if the movement of the table is other than truly vertical. In many machines the table is guided solely by the ram cylinder with a spaced pin or plunger sliding in the base to prevent angular movement of the table, and the ram and cylinder are subjected to very heavy loading and when wear takes place there is no effective means of adjustment.

One object of my invention is to provide means whereby the table is effectively guided independently of the ram and whereby adjustment of the guiding means to compensate for wear can be rapidly and easily effected without having to dismantle the machine so that the guiding of the table can be kept uniform and accurate throughout the life of the machine.

Other objects are to improve the functioning of the machine generally with a view to reducing wear and simplifying maintenance.

According to one feature of my invention, in a molding machine of the type set forth above machined vertical faces at each corner of the vertically movable table co-operate with complementary guiding surfaces or wear plates on the base which are adjustable towards and away from the table by means accessible from the outside of the base to compensate for wear and to allow the table to be guided smoothly and accurately with a minimum of friction.

Alternatively the guiding surfaces or wear plates on the base may be fixed while co-operating surfaces on the tables are adjustable.

One practical design of molding machine incorporating my invention is illustrated by way of example in the accompanying drawings in which:

Figure 2 is a plan in part section.

Figure 3 is a fragmentary section on the line 3—3 of Figure 2, but modified to illustrate a separate wear plate mounted on the table.

Figure 4 is a fragmentary section on the line 4—4 of Figure 2, but modified to illustrate a separate wear plate mounted on the guide member.

Figure 1:
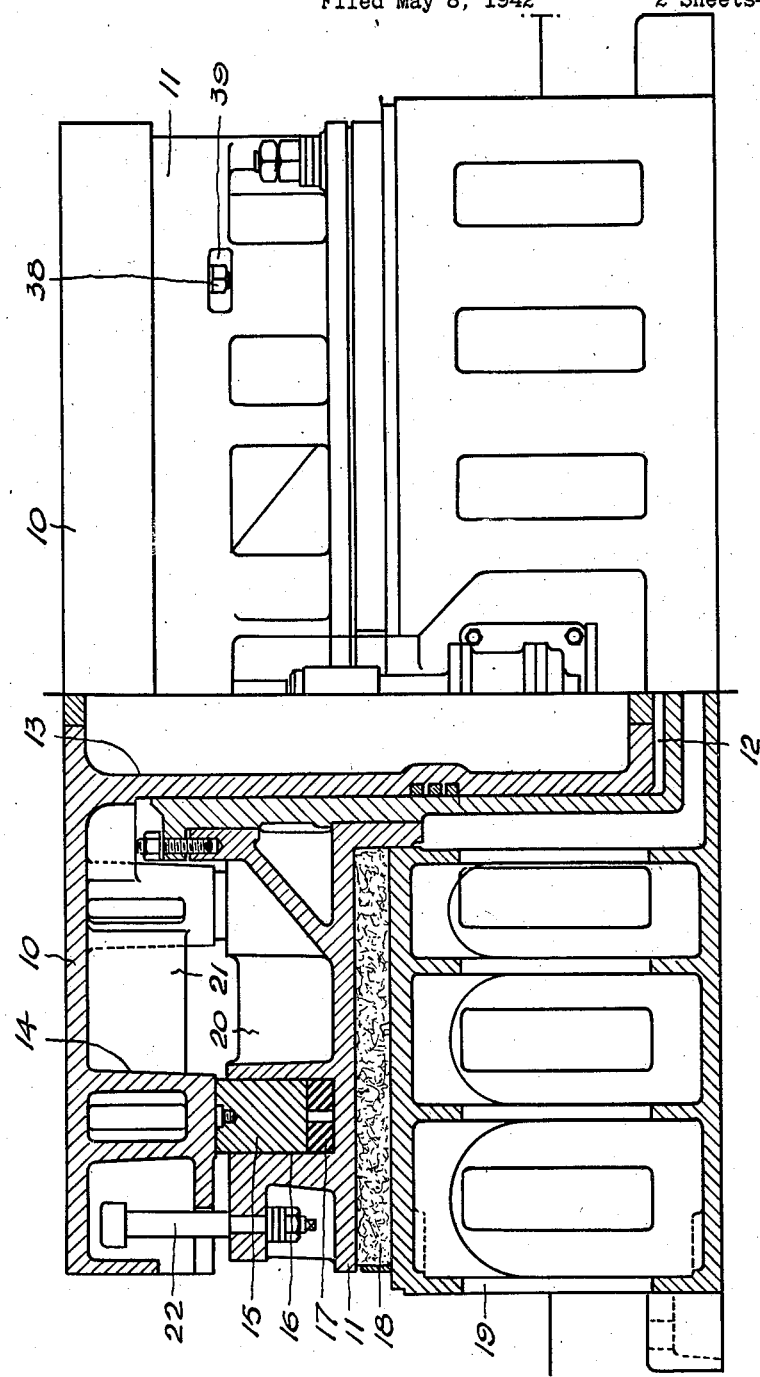
Figure 1 is a side elevation in part section of the complete machine.

The molding machine illustrated comprises a flat table 10 adapted to receive a mold and vertically movable on a base 11. The vertical movement of the table is effected in the ordinary way by the admission of compressed air to centrally located vertical ram cylinder 12 which is carried by the base and in which works a ram 13 forming part of the table.

The table is raised by the compressed air and on release of the air the table is allowed to drop on to the base to jar and ram the mold, as is usual in machines of this type.

The impact is taken by a number of spaced bosses 14 on the bottom of the table which engage steel plungers 15 vertically slidable in cylindrical recesses 16 in the base, a hard rubber or other resilient buffer 17 being arranged in the bottom of each recess to produce a bump which is dead solid and free from metallic shock and rebound. This method of taking the impact distributes the shock uniformly over the whole area of the table and ensures uniform density of ramming in the mold. The recesses 16 and the plungers 15 which work in them are made of considerable axial length to ensure a truly vertical movement of the plungers and prevent any risk of the plungers jamming in the recesses.

To minimise transmission of the shock to the ground and to any surrounding plant a thick layer of vibration deadening and absorbing material 18 is arranged between the base 11 and a heavy subbase 19 on which it is mounted and which is set on a substantial concrete foundation.

The table and the base are stiffened by internal ribbing 20 and 21. Excessive upward movement of the table on the base is prevented by vertical bolts 22 fixed in the base and extending through slots in lateral flanges 23 on the table.

At each corner of the table below the upper surface there are two flat machined vertical surfaces 25, 26 extending at right angles to each other and these surfaces are engaged by and co-operate with complementary guiding surfaces 27, 28 on a member 29 which is adjustable in a horizontal direction along a line bisecting the angle at the corner. For the adjustment of the member 29 a stud 30 secured into the member and projecting outwardly from it in the line of adjustment extends through an abutment 31 on the base and a nut 32 is screwed on to the stud outside the abutment. A heavy helical spring 33 is fitted over the stud between the member 29 and the abutment and tends to urge the surfaces 27 and 28 on the member 29 inwardly against the guiding surfaces 25, 26 on the table, the member 29 being moved outwardly against the action of the spring by tightening the nut 32. The member 29 is supported by a flange or flanges 34 at its upper end resting on a rib 35 on the base which may be continuous with the abutment 31 for the spring. The member 29 is clamped in the correct adjusted position by means of bolts 36 passing through slots in the flange 34 and through bosses 37 on the rib 35 on the base.

Locking and unlocking of the clamping bolts is effected by a spanner applied to nuts 38 on the bolts below the bosses 37 which are accessible through openings 39 in the base, the bolts being held against rotation by angular collars 40 keyed on the lower ends of the bolts and in sliding engagement with the base.

On slackening off the clamping nuts 38 and the adjusting nuts 32 at each corner of the table the four sets of guiding surfaces 27, 28 are urged inwardly by their springs 33 with equal pressure and automatically centre the table with respect to the base and also centre the ram 13 on the table accurately with respect to its cylinder 12. Each adjusting nut 32 is then simply tightened by an equal amount to withdraw the guiding surfaces 27, 28 sufficiently far against the action of the springs 33 to give the requisite working clearance for the table between these surfaces and the surfaces 25, 26, and the clamping nuts 38 are tightened to lock the members 29.

The adjustment is thus extremely simple to effect and can be carried out by a maintenance engineer as part of his ordinary routine work.

The surfaces 27, 28 may be integral parts of the members 29 as shown in the drawings or they may be formed by separate wear plates secured to the members 29. Similarly, the surfaces 25, 26 may be integral parts of the table or may be formed by separate wear plates secured to the table so that they can be readily renewed when worn. The lines 41 in Figure 3 indicate how a separate wear plate can be fitted to the vertical base of the table and similar lines 42 in Figure 4 show how a separate wear plate can be fitted to the member 29 on the base, the plates in each case being detachably secured in position by bolts or studs.

In an alternative arrangement the adjustable guide surfaces may be mounted on the table while the co-operating surfaces on the base are fixed, and as the carrying out of this modification will be obvious to any engineer it has not been illustrated.

I claim:

1. A molding machine comprising a stationary base, a mold-receiving table vertically movable on the base, means for moving the table vertically, machined vertical surfaces at right angles to each other on the table adjacent each corner thereof, a member carrying complementary vertical guiding surfaces adapted to co-operate with the surfaces on the table and mounted on the base adjacent each corner of the table, and means for adjusting said member towards and away from the table in a direction along a line bisecting the angle at the corner of the table.

2. A molding machine comprising a stationary base, a mold-receiving table vertically movable on the base, means for moving the table vertically, machined vertical surfaces at right angles to each other on the table adjacent each corner thereof, a member carrying complementary vertical guiding surfaces adapted to co-operate with the surfaces on the table and adjustably mounted on the base adjacent each corner of the table, a stud secured in said member and projecting outwardly in a direction bisecting the angle at the corner of the table, an abutment on the base through which said stud extends, a compression spring on said stud between the member and the abutment, a nut screwed on the stud outside the abutment, and means for clamping the member to the base.

3. A molding machine according to claim 2 in which the adjustable member is supported by a flange thereon resting on a rib on the base, and the clamping means comprise bolts passing through the flange and rib and accessible from the outside of the base.

PERCY PRITCHARD.